Patented Dec. 13, 1949

2,491,455

UNITED STATES PATENT OFFICE 2,491,455

PLASTICIZED POLYVINYL FORMAL RESIN

William R. Richard, Ann Arbor, Mich., assignor to Monsanto Chemical Company, St. Louis, Mo., a corporation of Delaware No Drawing. Application October 13, 1947, Serial No. 779,654

9 Claims. (Cl. 260—31.4)

This invention relates to polyvinyl formaldehyde acetal resin compositions. More particularly, this invention relates to plasticized polyvinyl formals.

The problem of providing suitable materials for plasticizing polyvinyl formals has proved to be particularly difficult. Thus, in contrast to other acetal resins such as polyvinyl butyrals, only a limited group of compounds have proved to be suitable. One of the chief difficulties has been lack of compatibility of compounds which are successful plasticizers for other high molecular weight materials, as for example, polyvinyl butyrals. Another difficulty has been the tendency of such materials as are sufficiently compatible with polyvinyl formal, to volatilize from the plasticized resin at elevated temperatures.

It is an object of this invention to provide plasticized polyvinyl formal resin compositions. A particular object of this invention is to provide plasticized polyvinyl formals of improved stability at elevated temperatures.

These and other objects are attained, according to this invention, by incorporating in polyvinyl formal a dialkoxyethyl ester of a phthalic acid from the group 3-nitro and 4-nitro phthalic acids, wherein the alkoxy groups contain 1–4 carbon atoms. Thus, it has been found that the above described esters have a high degree of compatibility with polyvinyl formal and at the same time, have a greatly decreased rate of volatilization from the polyvinyl formal compositions.

The following examples are given in illustration of the present invention, but are not to be considered as limitative thereof. Where parts are mentioned, they are parts by weight.

The polyvinyl formal used in the examples is made by simultaneously hydrolyzing and reacting with formaldehyde a polyvinyl acetate of such a viscosity that a one-molar benzene solution thereof has a viscosity of 15 centipoises at 20° C. The reaction is carried out under such conditions that the product contains 7–9% hydroxyl groups by weight calculated as polyvinyl alcohol, 9–13% acetate groups by weight, calculated as polyvinyl acetate and the balance substantially formaldehyde-acetal.

Example I 100 parts of the polyvinyl formal described above are intimately mixed with 100 parts of the dimethoxyethyl ester of 4-nitro-phthalic acid and the mixture pressed into a sheet about 0.020 inch in thickness, by subjecting the mixture to the temperature and pressure obtained by the use of steam at 140 pounds per square inch gauge pressure. The resulting sheet is clear, flexible and somewhat elastic.

Example II

Example I is repeated except that 25 parts of dibutoxyethyl-4-nitro phthalate are used for every 100 parts of polyvinyl formal. Sheets prepared from this composition are generally similar to those of Example I, although somewhat stiffer.

In place of the dimethoxyethyl and dibutoxyethyl esters of 4-nitro phthalic acid, the diethoxyethyl or dipropoxyethyl esters may be used with generally similar results. Likewise, the dimethoxyethyl, diethoxyethyl, dipropoxyethyl and dibutoxyethyl esters of 3-nitrophthalic acid may be substituted for the esters in the examples to yield plasticized polyvinyl formal resin products of generally similar properties.

In contrast to the alkoxyethyl nitro phthalates of the invention, the use of the corresponding alkoxyethyl phthalates free from nitro groups gives greatly inferior results. In particular, the plasticizers of the invention show unexpectedly better retentivity in the compositions as compared with the corresponding phthalates which do not contain nitro groups. For example, on heating the sheets of Example I for 5 hours at 105° C. a weight loss of about 0.5% results. In contrast, substitution of dimethoxyethyl phthalate results in a weight loss under the same conditions of about 3.5%.

As pointed out above, the alkoxy portion of the esters used in the compositions of the invention may contain 1–4 carbon atoms. While the illustrative examples show esters in which both alkoxy groups are the same, corresponding esters may be used in which the alkoxy groups differ, provided neither contains more than four carbon atoms.

The amount of ester to be incorporated in the polyvinyl formal depends on a number of factors, for example, the intended use for the plasticized resin as well as the presence or absence of other plasticizers. The upper limit of compatibility of the plasticizers of the invention depends not only on the presence or absence of other plasticizers, but upon the nature of the alkoxy portion of the molecule. Thus, compatibility decreases as the number of carbon atoms in the alkoxy groups increases.

While, as indicated above, the amount of plasticizer depends, at least in part, on the intended use, it is desirable to have present at least 25 parts of plasticizer for every 100 parts of acetal resin and it is expected that the esters of the invention will be generally used in compatible amounts within the range 25-150 parts for every 100 parts of polyvinyl formal. A more preferred range is 40-100 parts of an ester of the invention for every 100 parts of polyvinyl formal.

Examples of other plasticizers which may be used in conjunction with the plasticizers of the invention include diacetin, diethyl phthalate, dibutyl tartrate, triethyl citrate, etc. For example, 25-50 parts of one or more of these plasticizers may be used in conjunction with 25-50 parts of one or more plasticizers of the invention in 100 parts of polyvinyl formal.

As is known to those skilled in the art, the composition of polyvinyl formal resins may be varied to a wide extent. This is indicated by U. S. Reissue 20,430 to Morrison et al. For example, the acetal resin may be made from polyvinyl acetate or other polyvinyl ester having widely varying viscosities. Thus, in the case of polyvinyl acetate, the degree of polymerization may be such that a one-molar benzene solution has a viscosity of 5-500 centipoises at 20° C. Corresponding variation in the degree of polymerization of other polyvinyl esters is permissible. As indicated in the Morrison et al. patent referred to above, polyvinyl formals may vary widely with respect to the relative proportion of hydroxyl ester and acetal groups. Among the preferred embodiments for the purposes of this invention are polyvinyl formals containing on a weight basis 0-35% ester groups calculated as polyvinyl ester, 3-15% hydroxyl groups calculated as polyvinyl alcohol and the balance substantially formal acetal. A still more preferred embodiment comprises polyvinyl formals containing 8-15% ester groups calculated as polyvinyl ester, 5-10% hydroxyl groups calculated as polyvinyl alcohol and the balance substantially formaldehyde acetal. In the preferred embodiments set forth above, the preferred ester groups are derived from acetic acid.

It is to be understood that the above description is given by way of illustration only, and not of limitation and that deviations are possible within the spirit of the invention.

What is claimed is:

1. A composition having improved plasticizer retentivity at elevated temperatures comprising a polyvinyl formal resin plasticized with a dialkoxyethyl ester of a phthalic acid from the group consisting of a 3-nitro phthalic acid and 4-nitro phthalic acid in which the alkoxy groups contain less than 5 carbon atoms.

2. A composition as defined in claim 1 in which the ester is an ester of 3-nitro phthalic acid.

3. A composition as defined in claim 1 in which the ester is an ester of 4-nitro phthalic acid.

4. A composition as defined in claim 3 in which the alkoxy groups are methoxy groups.

5. A composition as defined in claim 4 in which 25-150 parts by weight of the ester are used for every 100 parts of polyvinyl formal.

6. A composition as defined in claim 4 in which 100 parts by weight of the ester are used for every 100 parts by weight of polyvinyl formal.

7. A composition as defined in claim 1 in which a compatible amount of the ester is used, but said amount is at least 25 parts for every 100 parts of polyvinyl formal.

8. A composition as defined in claim 1 in which the ester is an ester of 4-nitro phthalic acid and in which the alkoxy groups are ethoxy groups.

9. A composition as defined in claim 8 in which the amount of ester does not exceed its compatibility with the acetal resin, but is at least 25 parts for every 100 parts of acetal resin.

WILLIAM R. RICHARD.

REFERENCES CITED

The following references are of record in the file of this patent:

UNITED STATES PATENTS

| Number | Name | Date |
|---|---|---|
| 2,072,739 | Dykstra | Mar. 2, 1937 |
| 2,120,934 | Groff | June 14, 1938 |